United States Patent
Mastromatteo et al.

(10) Patent No.: US 6,446,326 B1
(45) Date of Patent: Sep. 10, 2002

(54) METHOD FOR MANUFACTURING A HARD DISK READ/WRITE UNIT, WITH MICROMETRIC ACTUATION

(75) Inventors: Ubaldo Mastromatteo, Cornaredo; Bruno Murari, Monza; Benedetto Vigna, Potenza; Sarah Zerbini, Fontanellato, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/305,862

(22) Filed: May 5, 1999

(30) Foreign Application Priority Data

May 5, 1998 (EP) .............................. 98830269

(51) Int. Cl.[7] .......................... G11B 5/127; H04R 31/00
(52) U.S. Cl. ............................... 29/603.04; 29/603.07; 29/603.18; 29/603.19; 360/97.01; 360/98.01; 360/98.08; 360/99.12
(58) Field of Search ............... 29/603.04, 603.07, 29/603.18, 603.19; 360/97.01, 98.01, 98.08, 99.12

(56) References Cited

U.S. PATENT DOCUMENTS

| | | | |
|---|---|---|---|
| 3,789,378 A | 1/1974 | Bonzano et al. | 340/174.1 |
| 5,025,346 A | 6/1991 | Tang et al. | 361/283 |
| 5,151,763 A | 9/1992 | Marek et al. | 357/26 |
| 5,216,631 A | 6/1993 | Sliwa, Jr. | 365/174 |
| 5,233,213 A | 8/1993 | Marek | 257/415 |
| 5,293,282 A * | 3/1994 | Squirea | 360/77.08 |
| 5,428,259 A | 6/1995 | Suzuki | 310/309 |
| 5,438,469 A | 8/1995 | Rudi | 360/109 |
| 5,454,158 A * | 10/1995 | Fontana | 29/603.07 |
| 5,465,186 A * | 11/1995 | Bajorek | 360/323 |
| 5,477,097 A | 12/1995 | Matsumoto | 310/309 |
| 5,521,778 A | 5/1996 | Boutaghou et al. | 360/106 |
| 5,631,514 A | 5/1997 | Garcia et al. | 310/309 |
| 5,657,188 A | 8/1997 | Jurgenson et al. | 360/106 |
| 5,742,996 A * | 4/1998 | Frater | 29/603.06 |
| 5,796,557 A * | 8/1998 | Bagnell | 360/105 |

(List continued on next page.)

FOREIGN PATENT DOCUMENTS

| | | |
|---|---|---|
| EP | 0 482 205 A1 | 4/1992 |
| EP | 0 533 095 A2 | 3/1993 |
| EP | 0 578 228 A2 | 1/1994 |
| EP | 0 578 228 A3 | 1/1994 |
| EP | 0 613 124 A2 | 8/1994 |
| EP | 0 840 291 A2 | 5/1998 |
| FR | 2 296 297 | 7/1976 |
| JP | 07-177773 | 7/1995 |
| WO | WO 93/21536 | 10/1993 |
| WO | WO 95/34943 | 12/1995 |

OTHER PUBLICATIONS

Starr, "Squeeze–Film Damping in Solid–State Accelerometers," *IEEE Solid–State Sensor and Actuator Workshop*, pp. 44–47, Jun. 1990.

Zhang et al., "Viscous Air Damping in Laterally Driven Microresonators," *IEEE Workshop* No. 7, pp. 199–204, Jan. 25, 1994.

(List continued on next page.)

*Primary Examiner*—Peter Vo
*Assistant Examiner*—Paul Kim
(74) *Attorney, Agent, or Firm*—Lisa K. Jorgenson; Robert Iannucci; Seed IP Law Group PLLC (57) ABSTRACT

The method comprises the steps of: forming an integrated device including a microactuator in a semiconductor material wafer; forming an immobilization structure of organic material on the wafer; simultaneously forming a securing flange integral with the microactuator and electrical connections for connecting the integrated device to a read/write head; bonding a transducer supporting the read/write head to the securing flange; connecting the electrical connections to the read/write head; cutting the wafer into dices; bonding the microactuator to a suspension; and removing the immobilization structure.

17 Claims, 8 Drawing Sheets

U.S. PATENT DOCUMENTS

| | | | | |
|---|---|---|---|---|
| 5,901,430 A | * | 5/1999 | Ziegler | 29/603.06 |
| 5,924,187 A | * | 7/1999 | Matz | 29/603.03 |
| 5,968,927 A | * | 10/1999 | Nigam | 428/65.3 |
| 5,978,174 A | * | 11/1999 | Sulivan | 360/97.01 |
| RE36,538 E | * | 2/2000 | McKay | 29/603.07 |
| 6,063,508 A | * | 5/2000 | Hanrahan | 428/596 |
| 6,183,841 B1 | * | 2/2001 | Hanrahan | 428/132 |

OTHER PUBLICATIONS

Veijola et al., "Model for Gas Film Damping in a Silicon Accelerometer," *1997 International Conference on Solid–State Sensors and Actuators*, pp. 1097–1100, Jun. 16–19, 1997.

Tang et al., "Laterally Driven Polysilicon Resonant Microstructures," *Sensors and Actuators*. (20):25–32, Nov. 15, 1989.

Gianchandani et al., "Batch Fabrication and Assembly of Micromotor–Driven Mechanisms With Multi–Level Linkages," *Micro Electro Mechanical Systems*, IEEE, pp. 141–146, 1992.

Lee et al., "Polysilicon Micro Vibromotors," *Micro Electro Mechanical Systems*, IEEE, pp. 177–182, Feb. 4–7, 1992.

Fujita et al., "Position Control Of An Electrostatic Linear Actuator Using Rolling Motion," *Mechatronics*, vol. 2, No. 5, pp. 495–502, Oct., 1992.

Fan et al., "Magnetic Recording Head Positioning at Very High Track Densities Using a Microactuator–Based, Two–Stage Servo System," *Transactions on Industrial Eletronics*, IEEE, 42(3):222–233, Jun. 1995.

Moesner et al, "Electrostatic Devices For Particle Micro–Handling," *IEEE*, pp. 1302–1309, 1995.

Imamura et al., "Transverse Mode Electrostatic Microactuator For MEMS–Based HDD Slider," *IEEE*, pp. 216–221, 1996.

Horsley et al., "Angular Micropositioner For Disk Drives," *IEEE MEMS '97 Workshop* Nagoya, Japan.

Pannu et al., "Accelerometer Feedforward Servo For Disk Drives." Presented at the *Advanced Intelligent Mechatronics–International Conference*, Tokyo, Japan, Jun. 1997.

Aggarwal, "Design and Control of Micro–Actuators For High Density Disk Drives," *Thesis–Graduate Division— University of California at Berkeley*, May 1997.

Aggarwal et al., "Micro–Actuators For High Density Disk Drives," *American Control Conference*, 1997.

Peter Mee et al., "Only Clean Drives Are Good Drives," Data Storage, pp. 77–80, Sep., 1997.

* cited by examiner

METHOD FOR MANUFACTURING A HARD DISK READ/WRITE UNIT, WITH MICROMETRIC ACTUATION

TECHNICAL FIELD

The present invention relates to a method for manufacturing a hard disk read/write unit having micrometric actuation.

BACKGROUND OF THE INVENTION

As is known, hard disks are the most commonly used data storage solution. Consequently, they are produced in very large volumes, and the maximum density of data storage is increasing year by year. Hard disks are read and written on by actuator devices, the general structure whereof is shown in FIGS. 1 and 2, and is described hereinafter.

Figure 1:
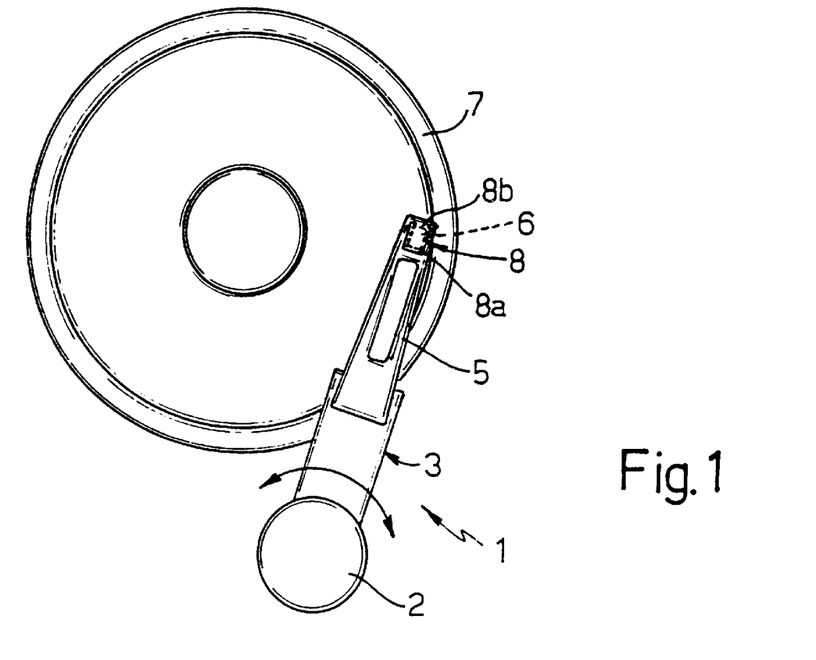
FIG. 1 shows a top view of a known type of an actuator for hard disks.
Figure 2:
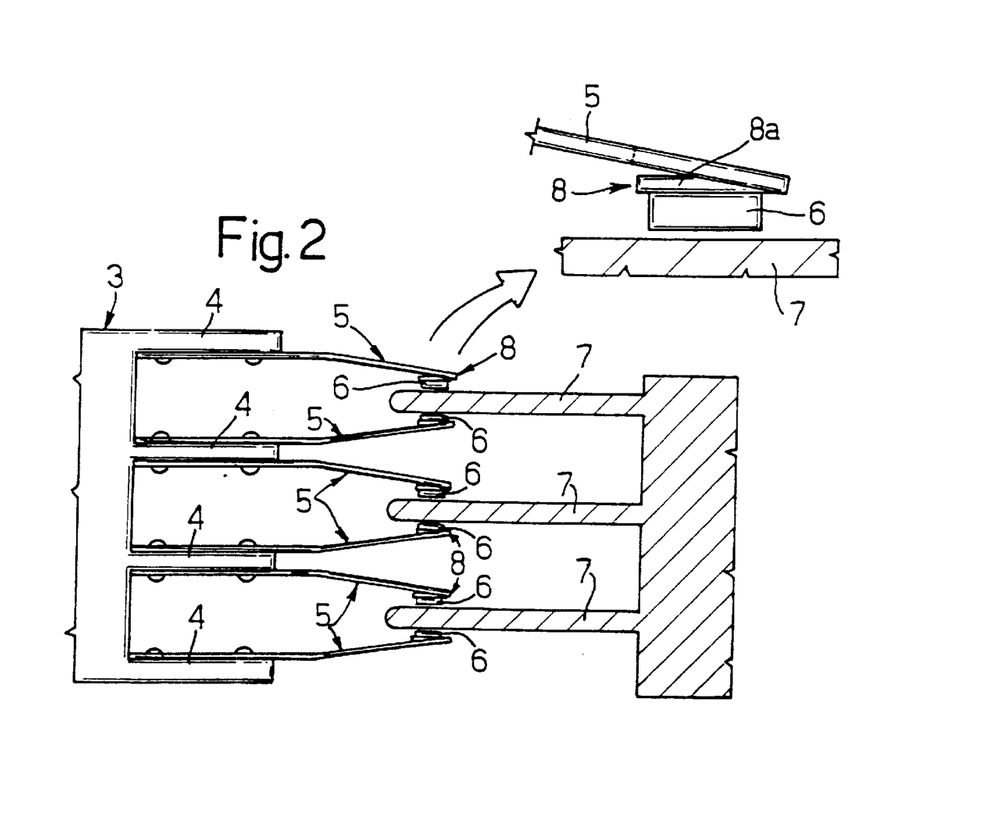
FIG. 2 shows an enlarged lateral view of some parts of the actuator of FIG. 1.

In particular, FIG. 1 shows an actuator device 1 of a known rotary type, which comprises a motor 2 (also known as a "voice coil motor") secured to a support body 3, which is generally known as an "E-block," owing to its "E" shape in lateral view (see FIG. 2). The support body 3 has a plurality of arms 4, each supporting a suspension 5 formed by a cantilevered plate. At the end of each suspension 5 opposite to the support body 3, each suspension 5 supports an R/W transducer 6 for reading/writing, which, in an operative condition, is disposed facing a surface of a hard disk 7, such that the R/W transducer 6 can perform roll and pitch movements to follow the surface of the hard disk 7. To this end, the R/W transducer 6 (also known as a "picoslider" or "slider") is bonded to a coupling 8 (also known as a "gimbal"). The gimbal 8 is generally formed from the suspension 5 itself and comprises, for example a rectangular plate 8a, cut on three and a half sides from a plate of the suspension 5, and having a portion 8b connected to the suspension 5 to allow bending of the plate 8a by the weight of the R/W transducer 6 (see FIG. 3).

At present, the maximum track density of hard disks is approximately 5000 tracks per inch (TPI), but it is expected that in the near future, a density of at least 25,000 TPI can be achieved. This is equivalent to a distance between tracks of approximately 1 μm and a tracking accuracy better than 0.1 μm.

Figure 3:
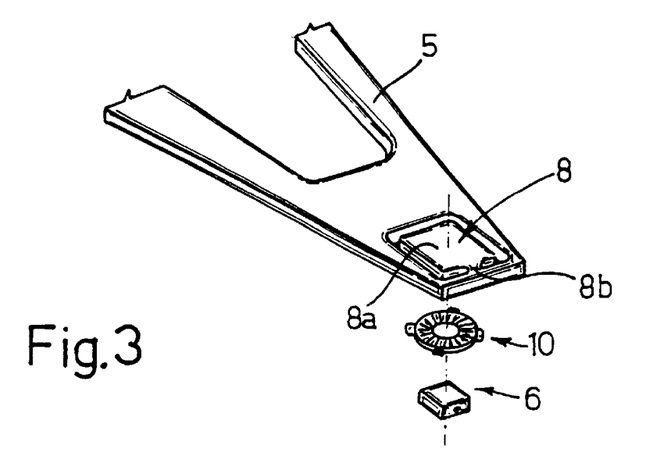
FIG. 3 shows an exploded view of an embodiment of a micrometric actuator unit in an actuator device having a double actuator step.

These density levels cannot be obtained by simply improving the present technology, owing to the existing mechanical problems (e.g. resonance of the positioning arms and low frequency effects). It has thus been proposed to use a double actuation stage having a rougher first actuation stage, with the motor 2 moving an assembly formed by the support body 3, the suspension 5 and the R/W transducer 6 across the hard disk 7 during the tracking, and a second actuation stage performing a finer control of the positioning of the R/W transducer 6. Two solutions have been proposed hitherto: (1) millimetric actuation, where the suspension 5 or the support body 3 are adjusted to control in a millimetric manner the position of the suspension 5, and (2) micrometric actuation, where the position of the R/W transducer 6 is controlled with respect to the suspension 5 through a microactuator interposed between the R/W transducer 6 and the suspension 5. The micrometric solution is shown in FIG. 3, which is an exploded view of the end of the suspension 5, the gimbal 8, the R/W transducer 6 and a rotary-type microactuator 10. The microactuator 10 is controlled by a signal supplied by control electronics, on the basis of tracking errors.

The millimetric solution has the disadvantage that it causes considerable consumption, cannot be obtained by batch production processes, and does not permit high accuracy, and thus does not allow very high density disks to be read. However these problems are solved by the micrometric solution, to which the present invention therefore relates.

In order to manufacture the microactuator 10, different solutions have been proposed, based on electrostatic, electromagnetic and piezoelectric principles. Electrostatic microactuators are generally of a rotary type and comprise two basic elements: (1) a stator secured to the gimbal 8, and (2) a rotor freely movable with respect to the stator and secured to the R/W transducer 6. On the other hand, electromagnetic microactuators substantially comprise variable reluctance micromotors having windings, the purpose of which is to generate a magnetic field attracting a magnetic core. The proposed electromagnetic microactuators are also of the rotary type, since these have greater resistance to impacts than linear microactuators. Microactuators of the piezoelectric type use the piezoelectricity of specific materials in order to obtain movement of a mobile part with respect to a fixed part, and are generally of the linear type.

Microactuators are currently made of two materials: (1) polysilicon inside a suitably excavated wafer (see, e.g., European Patent Application No. 97830556.3 filed on Oct. 29, 1997 in the name of the same applicant); and (2) metal generally grown galvanically on a semiconductor material wafer (see, e.g., the article "Magnetic Recording Head Positioning at Very High Track Densities Using a Microactuator-Based, Two-Stage Servo System" by L. S. Fan, H. H. Ottesen, T. C. Reiley, R. W. Wood, IEEE Transactions on Industrial Electronics, Vol. 42, No. 3, June 1995).

In both cases, problems exist in that when assembling the read/write head to the microactuator 10 and forming the connections with the control circuitry, displacement of the various components can occur, and/or the suspended structures can stick. In addition, stresses can arise to create conditions of fragility of the structure.

SUMMARY OF THE INVENTION

Accordingly, one advantage of the invention is to provide a method of manufacturing a read/write unit including at least the microactuator and the read/write transducer, the method using conventional microelectronics manufacturing techniques, and as far as possible, reducing offset and residual stresses.

According principles of the present invention, a method is provided for manufacturing a hard disk read/write unit having micrometric actuation. In an embodiment of the invention, the method comprises forming an integrated device including a microactuator securable to a suspension device, forming an immobilization structure for the microactuator, and securing a read/write transducer to the microactuator after forming the immobilization structure. The method can further comprise removing the immobilization structure after securing the transducer to the microactuator. The securing of the transducer to the microactuator comprises forming a securing flange rigid with the microactuator and bonding the transducer to the securing flange. The method further comprises forming electrical connections between the transducer and the integrated device.

DETAILED DESCRIPTION OF THE INVENTION

Figure 4:
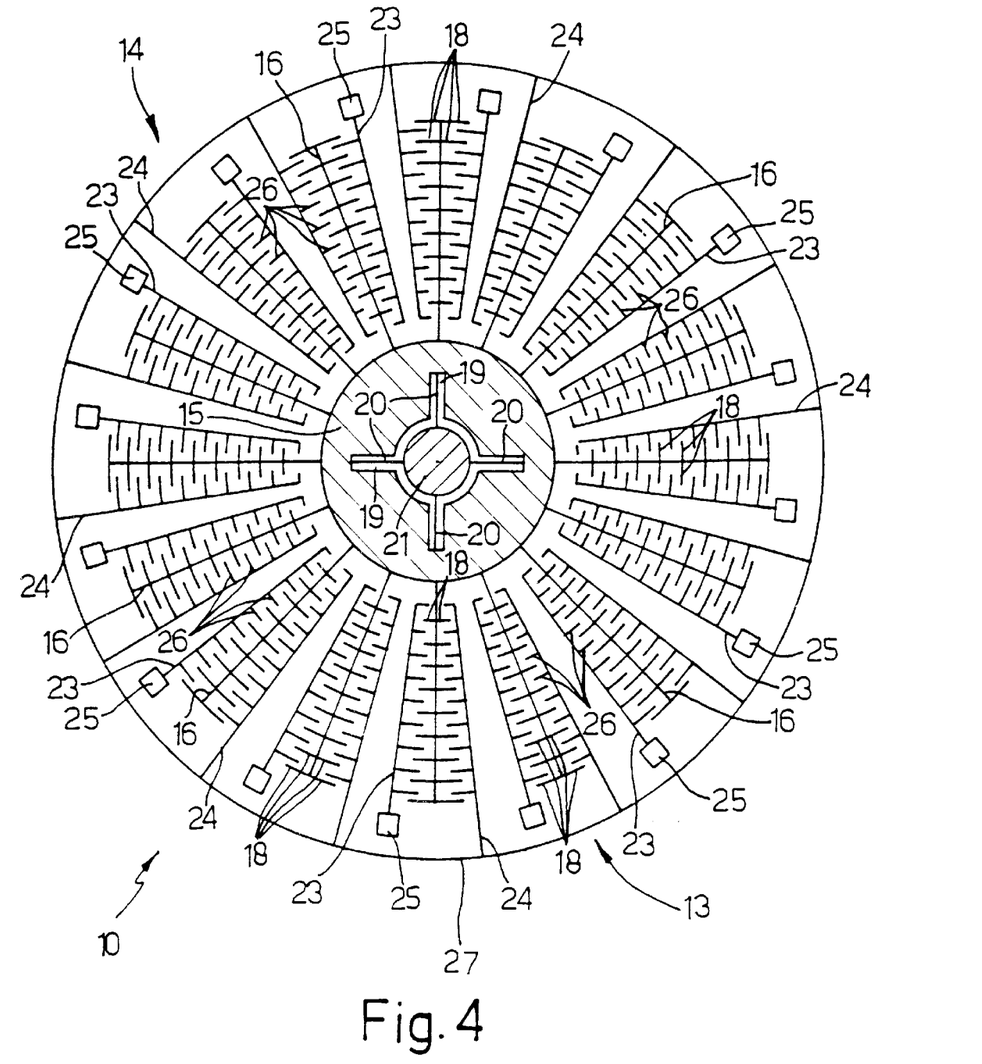
FIG. 4 shows a schematic representation of an embodiment of a rotary-type microactuator.

With reference to FIG. 4, the microactuator 10 comprises an external stator 13, designed to be connected, along with other components of a dice which accommodates the microactuator 10, to the plate 8a of gimbal 8 (see FIG. 3), and an internal rotor 14 connected capacitively to the stator 13 and designed to be bonded to the R/W transducer 6 (see FIG. 3).

The rotor 14 comprises a suspended, movable mass 15 having a substantially annular shape and a plurality of movable arms 16 extending radially towards the exterior, starting from the movable mass 15. Each movable arm 16 supports a plurality of elongated extensions to form movable electrodes 18. The movable electrodes 18 extend on both sides of the movable arms 16, in a substantially circumferential direction (i.e., perpendicular to the respective movable arm 16).

The movable mass 15 has four annular slots 19 extending radially from the inner circumference and four resilient suspension and anchorage elements (called hereinafter "springs") 20 extending inside the annular slots 19 for resiliently and electrically connecting the movable mass 15 to a fixed anchorage region 21. The anchorage region 21 has a circular shape and is disposed concentrically to the movable mass 15 of the rotor. The anchorage region 21 allows biasing of the movable mass 15 and of the movable electrodes 18 of the rotor 14 through a buried conductive region, as shown in detail in FIGS. 5–12.

The stator 13 comprises a plurality of first fixed arms 23, each first fixed arm 23 extending in a radial direction to the left of each movable arm 16, and a plurality of second fixed arms 24, each second fixed arm 24 extending in a radial direction to the right of each movable arm 16. Each first fixed arm 23 extends from a respective first fixed region 25. The fixed regions 25 are arranged circumferentially around the rotor 14 and are connected electrically to one another by buried or surface connections (not shown) to bias the first fixed arms 23 to a first voltage. The second fixed arms 24 extend from a single second fixed region 27 having an annular shape and externally delimiting the microactuator 10. The first and the second fixed arms 23, 24 each support a plurality of elongated extensions extending towards the respective movable arms 16 in a substantially circumferential direction (i.e., perpendicular to the respective fixed arm 23, 24) and define fixed electrodes 26. In particular, the fixed electrodes 26 are intercalated or interleaved with the movable electrodes 18.

In the microactuator of FIG. 4, in a known manner, the fixed electrodes 26 and the movable electrodes 18 are interleaved with one another to form a plurality of capacitors arranged in parallel with one another. When potential differences $\Delta V_1$, $\Delta V_2$ are applied between the fixed arms 23 and 24 and movable arm 16 and by virtue of the capacitive connection, each movable arm 16 is subjected to a transverse force which tends to move the movable arm 16 away from the fixed arms 23, 24 with which the movable arm 16 has the least potential difference, and to move the movable arm 16 closer to the other arm 24, 23 with the greater $\Delta V$. These forces give rise to a rotation of the suspended mass 15, accompanied by a resilient deformation of the springs 20.

The microactuator 10 of FIG. 4 can be made of polycrystalline silicon or of metal.

If the microactuator 10 is made of polycrystalline silicon by forming trenches in an epitaxial layer (similar to the process described in the aforementioned European Patent Application No. 97830556.3 and not shown in detail herein but incorporated by reference), then the process comprises initial steps in which buried contact regions are formed in a monocrystalline silicon substrate. Then, sacrificial silicon oxide regions are formed on and partially inside the substrate, in the area on which the rotor 14 must be formed, and electrical isolation regions are formed selectively on the substrate. Then, using a polycrystalline silicon seed region, an epitaxial layer is grown, which is of polycrystalline where the microactuator 10 is to be formed, and is monocrystalline where the circuitry is to be formed.

In a known manner, in and on the epitaxial layer, conductive regions are then formed to implement the circuitry, the isolations, and the connections thereof. Pads then are formed, including pads for connecting the R/W transducer 6. A passivation layer is deposited and removed from the areas of the pads and the microactuator 10. Trenches are then formed in the polycrystalline silicon area of the epitaxial layer to define the microactuator 10 and to separate the rotor 14 from the stator 13, as well as to separate the areas with different bias. Finally, sacrificial regions are removed through the trenches to form air gaps.

Figure 5:
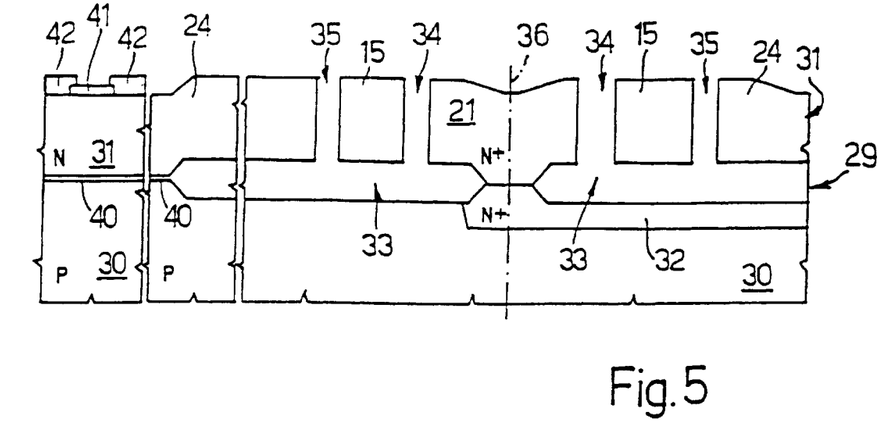
FIGS. 5–11 show cross-sectional views through a silicon wafer accommodating a first embodiment of the microactuator of FIG. 4 in successive production steps.

The result of the process described above is the structure of FIG. 5. FIG. 5 shows a wafer 29 comprising a P-type substrate 30 and an epitaxial layer 31, which, in the illustrated area, has an N conductivity type and a polycrystalline structure. In FIG. 5, a region 32 is an N-type buried region to bias the rotor 14, and is in direct electrical contact with anchorage region 21. A region 33 is an air gap with an annular shape extending below the movable mass 15, the fixed and movable arms 23, 24, 16. Trenches 34, 35 separate the movable mass 15 of the rotor 14 from the anchorage region 21 and from the fixed arms 23, 24 of the stator 13. A plane 36 defines a symmetry axis of the microactuator 10, which, has substantially radial symmetry except for in the bias region 32. In the cross-sectional view of FIG. 5 (as well as in the successive cross-sectional views), two of the fixed arms 24 are shown which are diametrically opposed to one another, but the movable arms 16 and the fixed arms 23 cannot be seen. In the portion of FIG. 5 which is furthest to the left, an area is visible wherein the head pads are provided. In particular, in this portion, an oxide layer 40 selectively isolates an epitaxial layer 31 from the substrate 30 (but is not present in the monocrystalline area). A pad 41 and part of an passivation layer 42 are visible.

Figure 6:
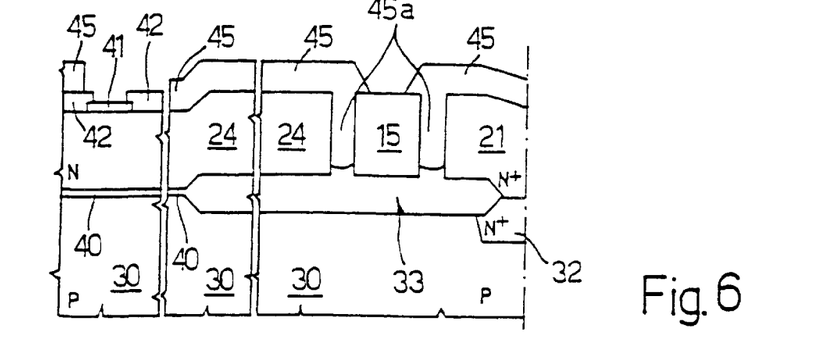
Figure 7:
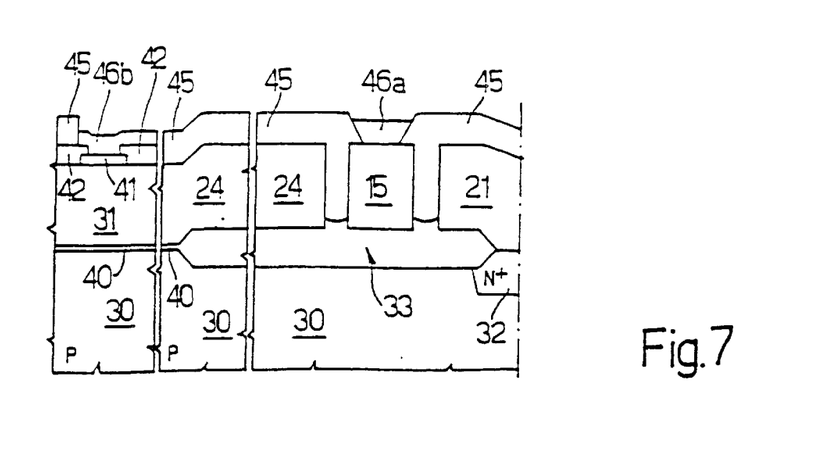
Figure 8:
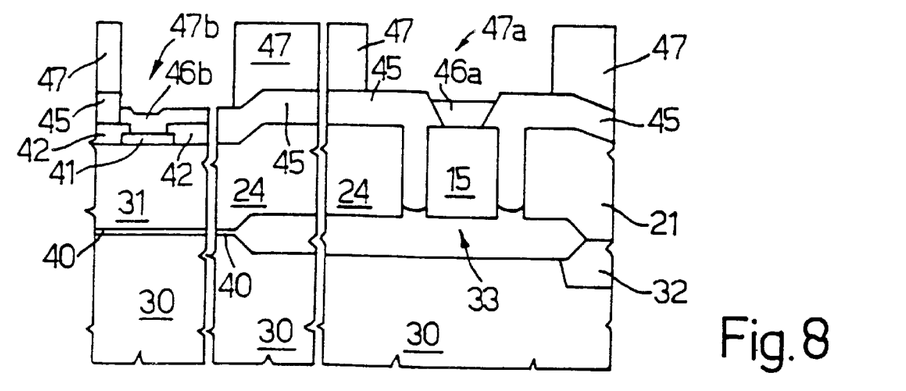

Starting from the structure of FIG. 5 and going to the structure of FIG. 6, the present method comprises immobilizing the rotor 14 with an organic material. In particular, a sacrificial layer 45 (comprising of a resin or a polyimide such as pix) is deposited to cover the entire wafer surface and to fill the trenches 34, 35 with portions 45a. The sacrificial layer 45 is then removed by etching back (for example by using oxygen) on the areas where anchorages are to be provided for a support flange (as will be described below) of the R/W transducer 6 and on the pads 41.

An anchorage metal layer (for example nickel or copper) is then deposited, and by means of a mask (not shown), the anchorage metal layer is left only where the anchorages are to be formed. An anchorage region 46a is thus formed on the movable mass 15, and a connection region 46b is formed on the pads 41 (see FIG. 7). In a manner not shown, during this step anchorage regions can also be obtained to form surface metal electrical connections for the stator 13. Subsequently in the structure of FIG. 8, a mold mask 47 (for example of resist or resin defined through a hard mask) is deposited. In particular, the mold mask 47 covers all of the free surface areas, except for apertures 47a, 47b where support flanges and metal connections for the R/W transducer 6 are to be provided. In addition, in a manner not shown, the mold mask 47 can have apertures for connections to the stator 13.

Figure 9:
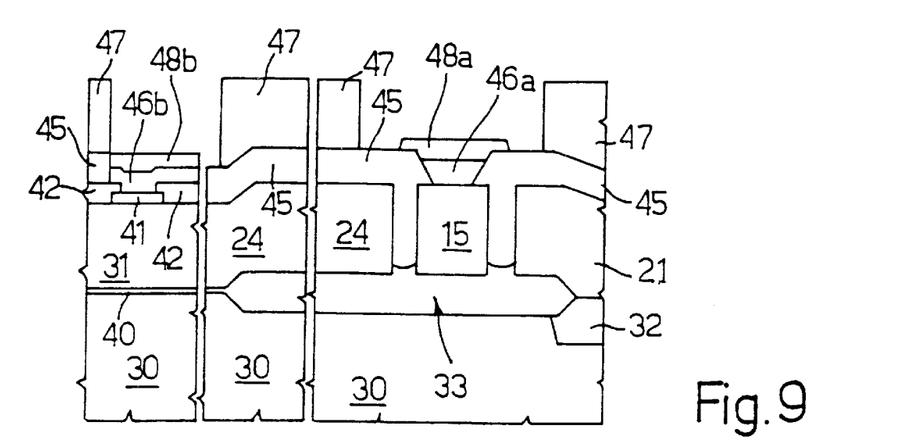
Figure 10:
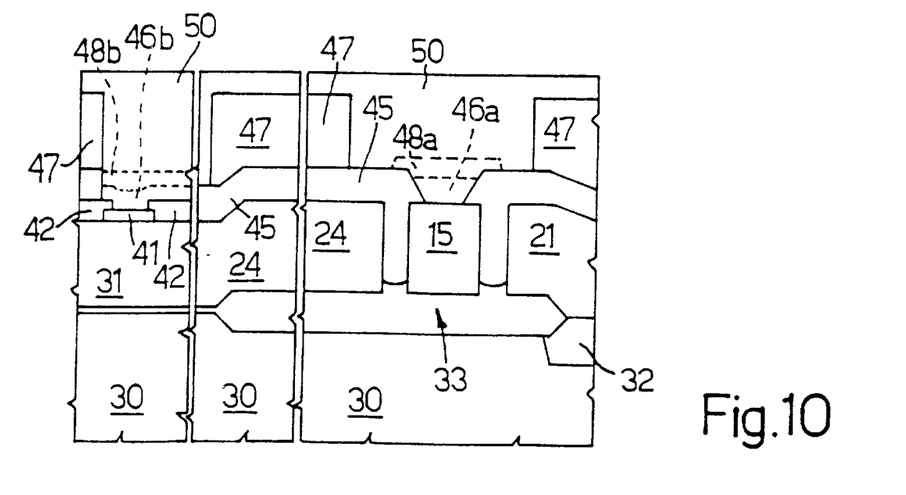

Subsequently electroless nickel or copper is grown. As shown in FIG. 9, regions 48a and 48b are grown on the anchorage regions 46a and the connection regions 46b. A metal layer 50 (for example copper) is then deposited to form a support flange and electrical connections covering the entire wafer surface (see FIG. 10). Inside of the apertures 47a, 47b of the mold mask 47, the metal layer 50 is in direct electrical contact with the regions 46a, 48a and 46b, 48b to form a single metal region. Thus in FIG. 10, the confines of the regions 46a, 48a, and 46b, 48b are represented only by broken lines, and the regions 46a, 48a and 46b, 48b are no longer represented in the subsequent FIGS. 11, 13 and 14.

Figure 11:
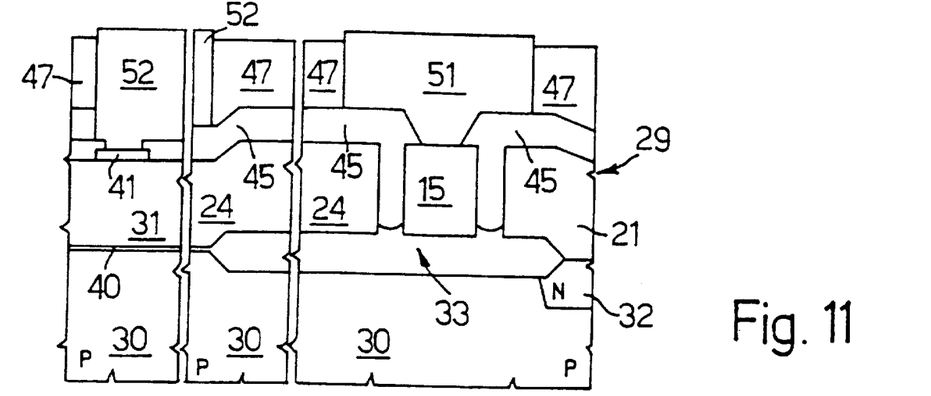
Figure 15:
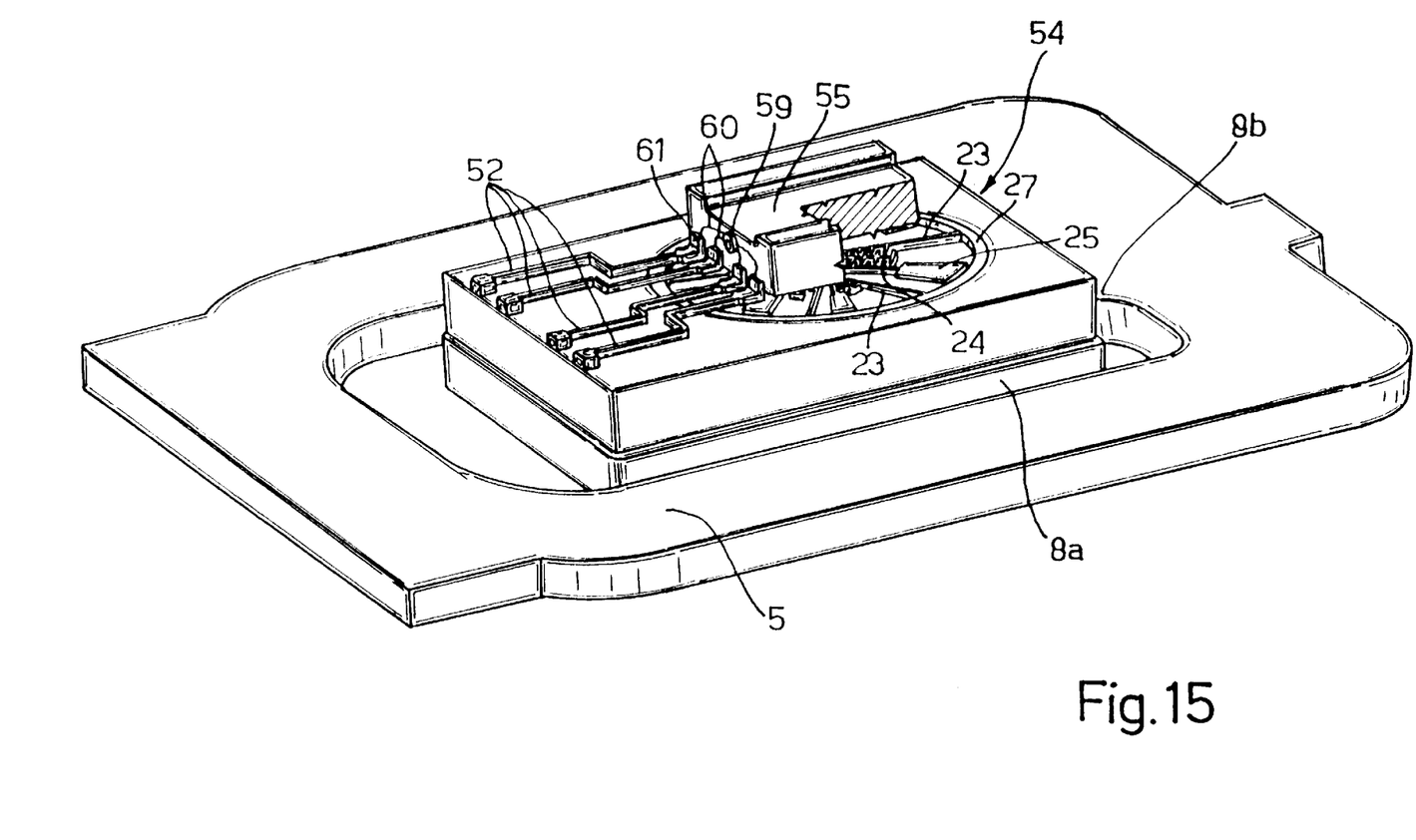
FIG. 15 shows a perspective view of a hard disk read/write unit of hard disks according to the first embodiment, in a final condition assembled to a gimbal.

The metal layer 50 is then masked and chemical etched to define a structure of a flange and electrical connections. Consequently, the metal layer 50 is removed from everywhere except the regions that define the flange 51 (together with the regions 46a, 48a) and the electrical connections 52 (together with regions 46b, 48b). After removing the mask, the structure of FIG. 11 is obtained, wherein the flange 51 and part of a connection 52 are visible (see FIG. 15 for the shape and layout of all the connections 52). Similarly, the surface connections (not shown) are formed for the stator 13 in this step.

Figure 12:
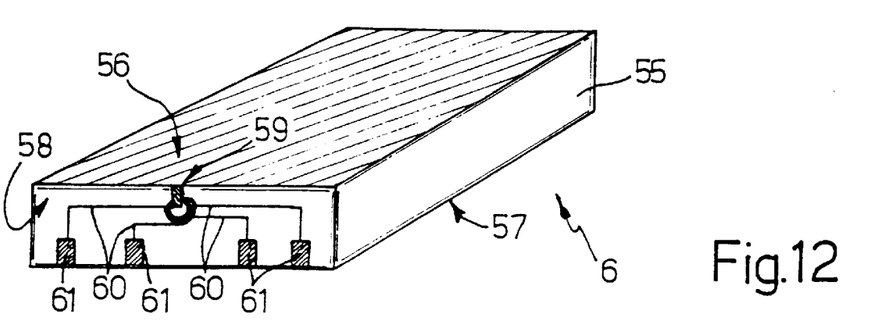
FIG. 12 shows a perspective view of an embodiment of a reading head to be bonded to the microactuator of FIGS. 4–11.
Figure 13:
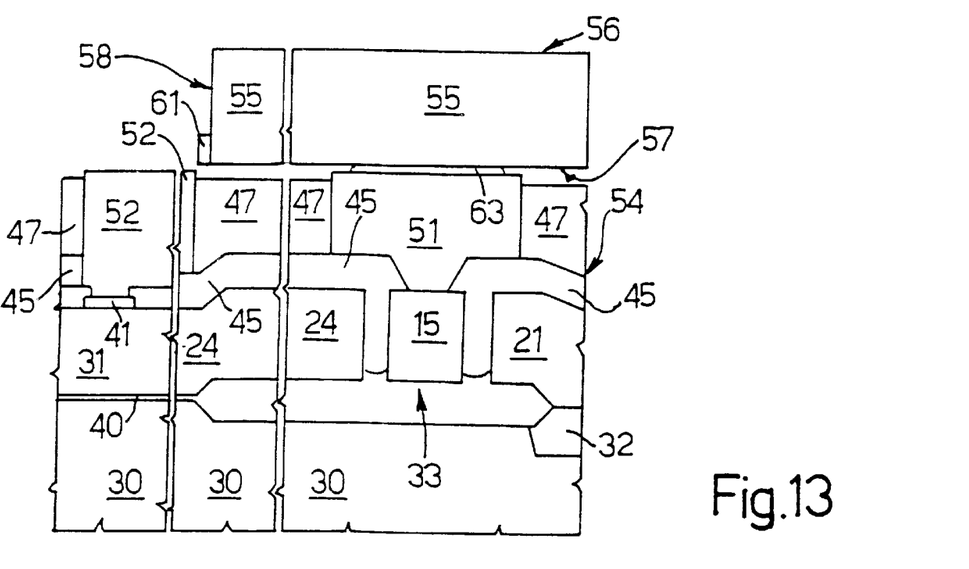
FIG. 13 shows a cross-sectional view similar to those of FIGS. 5–11 of the first embodiment, in a successive manufacturing step.

After cutting the wafer 29 into individual dices 54, the R/W transducer 6 is bonded (see FIG. 13). As shown in FIG. 12, the R/W transducer 6 comprises a support body 55 of ceramic material (for example AlTiC) having a parallelepiped shape, one main surface 56 of which (also called an "air bearing surface") is intended to face the hard disk 7 (see FIG. 2) to be read and/or written. The other main surface 57 of the support body 55 is bonded to the rotor 14 of the microactuator 10. A (magneto-resistive or inductive) head 59, defining the actual reading and writing device, is bonded to a smaller surface 58 of the support body 55, and is connected to the other components of the read/write unit 1 (see FIG. 1) by head electrical connections 60 which end at head pads 61. Both head electrical connections 60 and head pads 61 are disposed on the smaller surface 58 which supports head 59.

Figure 14:
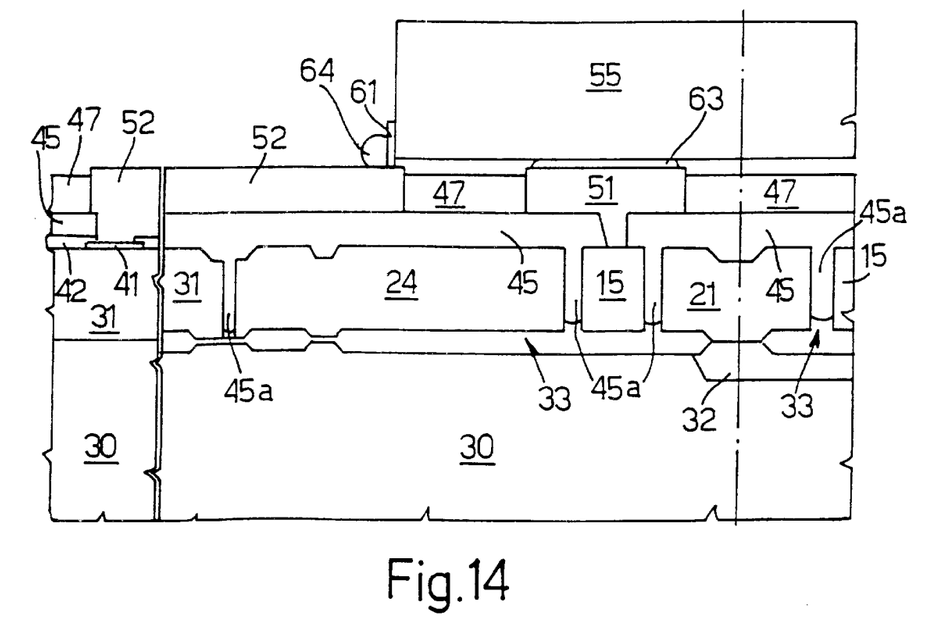
FIG. 14 shows a cross-sectional view of the silicon wafer of FIGS. 5–11, slightly displaced compared to FIG. 13 of the first embodiment, in a successive manufacture step.

The R/W transducer 6 is attached to the movable mass 15 by bonding, preferably by using a polymer material which can be cross-linked through ultraviolet rays ("cured glue"), indicated at 63 in FIG. 13. Subsequently, the head pads 61 are electrically connected to the connections 52 by ball bonding, by depositing a small ball 64 of conductive material (for example, gold, gold alloys, or lead-tin alloys) which puts the connection 52 into contact with the respective head pad 61 (see FIGS. 14 and 15). The assembly comprising of the dice 54 (ie., the microactuator 10 and its associated circuitry, not shown) and the R/W transducer 6 is then glued to the plate 8a of the gimbal 8. Gluing is accomplished by using a polymer material which can be cross-linked, similar to the cured glue bonding of the R/W transducer 6 to the microactuator 10, or by means of a laser or lead-tin preform, similar to techniques used to directly secure the R/W transducer 6 to the gimbal 8. The structure of FIG. 14 is thus obtained.

Finally, the mold mask 47 and the sacrificial layer 45 are removed, for example by plasma etching ("down stream"), to once again release the rotor 14 and the R/W transducer 6. The final structure is shown in the perspective view of FIG. 15, in which part of the R/W transducer 6 is broken to show the underlying microactuator 10.

Figure 16:
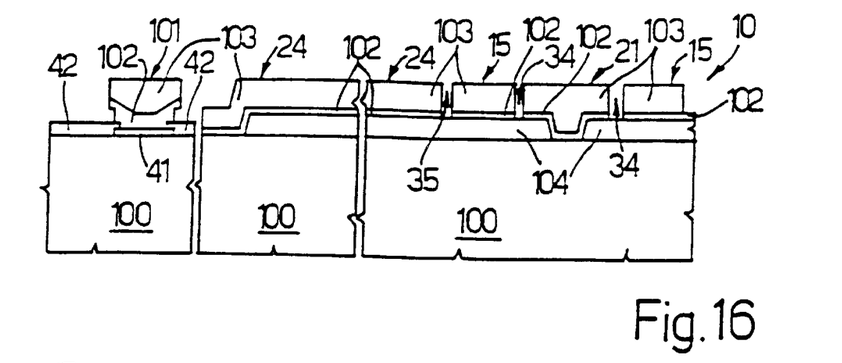
FIG. 16 shows a cross-sectional view similar to that of FIG. 5, of a second embodiment of the microactuator.

If the microactuator 10 is made of metal, it can be formed using galvanic or electroless growing. In the case of a galvanic grow, similar to the process described in the aforementioned article by Fan, Ottesen, Reiley, and Wood, the microactuator 10 is formed on a silicon substrate. To summarize, a first sacrificial layer, preferably of an organic polymer material, is formed on the substrate. The first sacrificial layer is removed where an anchorage for the rotor is to be provided, and an auxiliary metal layer known as a "seed layer" and necessary for galvanic growth, is deposited. A shaping layer (for example, resin) is then deposited and is removed where metal regions are to be formed (i.e., the stator 13 and the rotor 14 of the microactuator 10). A metal layer (for example copper) is then galvanically grown on the seed layer, where the latter is not covered by the shaping layer, to form the stator 13 and the rotor 14. The shaping layer and the uncovered portions of the seed layer are then removed by chemical etching (where the metal layer has not been grown galvanically). Thus, utilizing the process described above, the microactuator 10 of FIG. 16, including a substrate 100, is obtained wherein the anchorage region 21, the movable mass 15 and the fixed arms 24 of the stator 13 (as well as an electrical connection region 101 formed on the pad 41) contain portions of a seed layer 102 and portions of a galvanically grown metal layer 103. A first sacrificial layer is indicated at 104.

Figure 17:
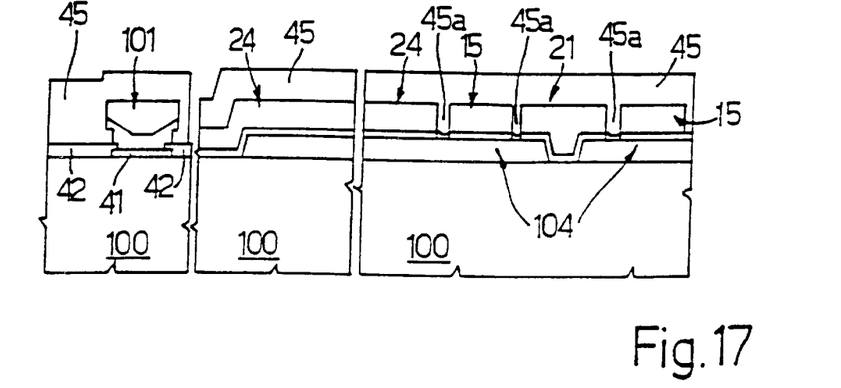
FIG. 17 shows a structure of the second embodiment of FIG. 16 in a successive manufacture step.

On the microactuator 10, a second sacrificial layer is deposited, corresponding to the sacrificial layer 45 and is identified by the same reference number in FIG. 17. The support and electrical connection structure of the R/W transducer 6 is then formed, exactly as described above for the polysilicon microactuator in FIGS. 7–15.

Figure 18:
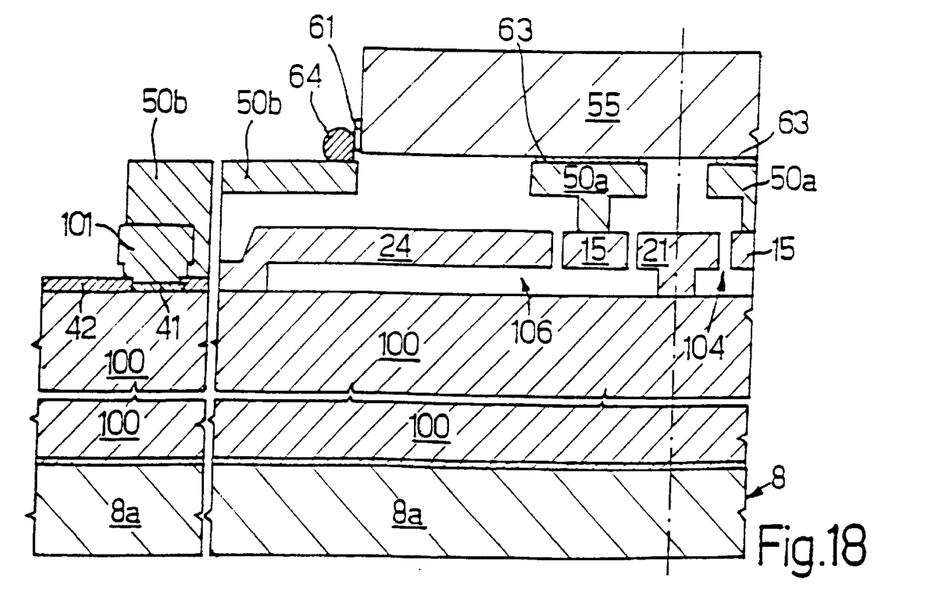
FIG. 18 shows a cross-sectional view of the read/write unit according to the second embodiment, in a final condition assembled to the gimbal.

After bonding the microactuator 10 to the R/W transducer 6, cutting the dice, and gluing the assembly to the gimbal 8, the sacrificial regions, including in this case the mold mask 47, the second sacrificial layer 45, and the first sacrificial layer 104, are removed to provide the final structure shown in FIG. 18 wherein the air gap obtained by removing the first sacrificial layer 104 is indicated at 106. The remaining regions and layers which are common to the embodiment shown in FIGS. 5–15 are indicated by the same reference numbers in FIG. 18.

The method described above provides that the various structures which are formed are retained in a definitive position by a framework formed by the sacrificial layer 45 and by the mold mask 47. This framework is robust enough to prevent deformations induced by the operations associated with securing the microactuator 10 to the R/W transducer 6 and by the electrical connection operations, which include joining the connections 52 to pads 41 and 61, forming electrical connections between the exterior and the circuitry formed in the dice 54 and associated with the microactuator 10 and/or with the head 59.

Except for the bonding of the R/W transducer 6, the manufacturing method comprises only steps which are typical of micro-electronics technology, and are thus easy to control, reliable, and low cost.

Finally, it is apparent that many modifications and variations can be made to the manufacturing method described and illustrated here, all of which come within the scope of the invention, as defined in the attached claims. In particular, it is emphasized that the method can be applied to any type of microactuator (which operates according to the electrostatic, magnetic, or piezoelectric principle, and is of the linear or rotary type), irrespective of the process for forming the microactuator, using polysilicon or metal with galvanic or electroless growth. In this case, the seed layer is no longer necessary, but several masks are necessary in order to define the shapes of an activation layer for the electroless chemical reaction and only in the areas where metal should be grown. In addition, instead of a single step as described, the trenches 34, 35 can be excavated in two different steps, with a partial filler interposed to prevent displacements of the rotor 14 with respect to the stator 13 while filling the trenches 34, 35 with the resin of the sacrificial layer 45. Cutting the dice 54 from the wafer 29 can take place either before or after gluing the R/W transducers 6. The flange 51 and the connections 52 may comprise further steps in addition to those described above. In particular, after depositing and defining the metal layer 50, the steps described with reference to FIGS. 7–11 can be repeated, such that the following steps are also included: forming further anchorage regions; forming a further mold mask; forming a further electroless growth; depositing a further metal layer; and defining this further metal layer, similar to the process described above. Only at the end of these further steps is the microactuator 10 glued to the R/W transducer 6 and to the gimbal 8. In this case therefore, the steps in FIGS. 7–11 form a "leg" of the flange 51, and the further steps (only described here) allow formation a "head" or gluing platform for the flange 51 itself. Finally, when forming the flange 51 and the connections 52 (either according to the process described with reference to FIGS. 7–11 or to the modified process described above), further metal structures can be formed, for example an annular structure which surrounds from the top the area of the dice 54 which accommodates the electrical components, so as to form a type of electrostatic protective screen for the electrical components themselves. According, in consideration of these possible variations, the invention is not limited except as by the appended claims, the scope of which is to be construed in accordance with established doctrines of claim interpretation.

What is claimed is:

1. A method for manufacturing a hard disk read/write unit having micrometric actuation, comprising:
   forming an integrated device including a microactuator securable to a suspension device the microactuator comprises an external stator connected to a plate of gimbal and an internal rotor connected to the stator and bonded to a hard disk read/write transducer;
   forming an immobilization structure on said microactuator after said microactuator is formed the immobilization structure being releasably coupled to the rotor; and
   securing said read/write transducer to said microactuator after forming the immobilization structure.

2. A method for manufacturing a hard disk read/write unit having micrometric actuation, comprising:
   forming an integrated device including a microactuator securable to a suspension device the microactuator comprises an external stator connected to a plate of gimbal and an internal rotor connected to the stator and bonded to a hard disk read/write transducer;
   forming an immobilization structure on said microactuator;
   securing a read/write transducer to said microactuator after forming the immobilization structure; and
   removing said immobilization structure after said securing said transducer to said microactuator.

3. A method for manufacturing a hard disk read/write unit having micrometric actuation, comprising:
   forming an integrated device including a microactuator securable to a suspension device the microactuator comprises an external stator connected to a plate of gimbal and an internal rotor connected to the stator and bonded to a hard disk read/write tranducer;
   forming an immobilization structure on said microactuator; and
   securing a read/write transducer to said microactuator after forming the immobilization structure; wherein said securing comprises:
      forming a securing flange rigid on said microactuator, said securing flange being immobilized by said immobilization structure; and
      bonding said transducer to said securing flange.

4. The method according to claim 3 wherein said securing flange is made of metal.

5. The method according to claim 3, further comprising forming electrical connections between said transducer and said integrated device, simultaneously with said forming said securing flange.

6. The method according to claim 5, wherein, before said step of securing, the step of forming the immobilization structure includes:
   forming a sacrificial layer of organic material extending above said integrated device and inside trenches in said microactuator;
   selectively removing regions of said sacrificial layer above areas of said microactuator anchorable to said transducer and above pads of said integrated device electrically connectable to said transducer; and
   forming a mold mask having apertures above the selectively removed regions of said sacrificial layer; wherein the step of forming said securing flange includes forming said securing flange and said electrical connections in said apertures of said mold mask.

7. The method according to claim 5, further comprising ball bonding said electrical connections to pads of said transducer after said securing the transducer.

8. The method according to claim 6, further comprising before said forming said mold mask:
   depositing a metal anchorage layer in the selectively removed regions of said sacrificial layer; and
   selectively removing said metal anchorage layer to form anchorage regions, only in said selectively removed regions of said sacrificial layer.

9. The method according to claim 8 wherein said forming said securing flange and said electrical connections comprises:
   electrolessly growing metal material portions on said anchorage regions;
   depositing a metal support layer; and
   defining said metal support layer to form said securing flange and said electrical connections.

10. The method according to claim 8 wherein said anchorage regions, said electrolessly grown metal material portions, said securing flange and said electrical connections are made of a metal selected from copper or nickel.

11. The method according to claim 6 wherein said sacrificial layer is made of a material selected from resin or pix.

12. The method according to claim 6 wherein said mold mask is made of a material selected from resist or resin.

13. A method for manufacturing a hard disk read/write unit having micrometric actuation, comprising:
   forming an integrated device including a microactuator securable to a suspension device the microactuator comprises an external stator connected to a plate of gimbal and an internal rotor connected to the stator and bonded to a hard disk read/write transducer;
   forming an immobilization structure for said microactuator;
   securing a read/write transducer to said microactuator after forming the immobilization structure; and, after said securing the transducer:
      securing said read/write unit to said suspension device; and
      removing said immobilization structure from said microactuator.

14. A method for manufacturing a hard disk read/write unit having micrometric actuation, comprising:
   forming an integrated microactuator comprises an external stator and an internal rotor including a suspended movable mass the movable mass being separated from the stator by a trench;
   forming an immobilization structure that extends inside the trench to restrict movement of the movable mass with respect to the stator;
   forming an anchorage region on the movable mass; and
   affixing a read/write transducer to the anchorage region while the immobilization structure immobilizes the movable mass with respect to the stator.

15. The method of claim 14 wherein forming the microactuator includes removing a sacrificial layer positioned below the movable mass, thereby suspending the movable mass, and wherein the immobilization structure is formed on the microactuator after the movable mass is suspended.

16. The method of claim 14 wherein the immobilization structure contacts and secures the anchorage region while the read/write transducer is affixed to the anchorage region.

17. The method of claim 14 wherein the affixing step includes forming a support flange affixed to the anchorage region and affixing the read/write transducer to the support flange.

\* \* \* \* \*

UNITED STATES PATENT AND TRADEMARK OFFICE
CERTIFICATE OF CORRECTION

PATENT NO.     : 6,446,326 B1
DATED          : September 10, 2002
INVENTOR(S)    : Ubaldo Mastromatteo et al.

It is certified that error appears in the above-identified patent and that said Letters Patent is hereby corrected as shown below:

Title page,
Item [30], the Foreign Application Priority date "May 5, 1999" should read as -- May 5, 1998 --.
Item [56], U.S. PATENT DOCUMENTS, "5,968,927" should read as -- 5,968,627 --.

Column 8,
Lines 25 and 26, "removing said immobilization structure after said securing said transducer to said microactuator." should read as -- removing said immobilization structure from said microactuator after said securing said transducer to said microactuator. --

Signed and Sealed this

Twenty-fifth Day of March, 2003

JAMES E. ROGAN
*Director of the United States Patent and Trademark Office*